United States Patent Office 3,598,568

Patented Aug. 10, 1971

3,598,568

METHOD OF PREPARING A MAGNETICALLY STABLE POWDER MAINLY CONSISTING OF IRON FOR MAGNETIC RECORDING

Cornelis Johannes Klomp and Gerard Willem van Oosterhout, Emmasingel, Eindhoven, Netherlands, assignors to U.S. Philips Corporation, New York, N.Y.

No Drawing. Filed Jan. 29, 1969, Ser. No. 795,078
Claims priority, application Netherlands, Jan. 31, 1968, 6801383
Int. Cl. B22f *9/00*
U.S. Cl. 75—.5AA 1 Claim

ABSTRACT OF THE DISCLOSURE

A method of preparing magnetically stable iron powder suitable for magnetic recording in which iron oxide hydrate, α-FeO(OH) is precipitated from a strongly reacting alkaline solution of ferrous hydroxide containing at least one compound of at least one metal selected from the group consisting of germanium, tin and aluminum in such a concentration that the atomic ratio of the latter metal to Fe in the solution is a least 0.005 while passing an oxidizing gas through the solution. The precipitate is thereafter separated from the liquid, washed, dried, and reduced in hydrogen at 250° to 500° C.

The invention relates to a method of preparing a magnetically stable powder mainly consisting of iron, for magnetic recording. A "magnetically stable powder" is to be understood to mean herein a powder of which the saturation magnetisation, after it has been exposed to atmospheric air for 24 hours, still is at least 90% of the value measured immediately after preparing the powder. Such magnetically stable powders are obtained by "stabilising" the freshly prepared powders, namely by immersing them in a suitably chosen organic liquid, for example, dioxane, acetone or ethanol, and then removing them from the liquid and liberating them from the adhering liquid.

Fine iron powders as a material for magnetic recording are known. It has already been proposed to prepare such powders by electrolysis of ferro-salt solutions, while using a mercury cathode. However, the cost involved in the use of said method on a technical scale is considerable. On the other hand it has been found that iron powders prepared by reduction of iron oxides are not very suitable for the use as a material for magnetic recording. It is the object of the invention to improve this.

The conventional method so far of preparing iron powders by reduction of iron oxides consisted in that iron oxide hydrate, α-FeO(OH) was precipitated from an alkaline reacting suspension of ferro-hydroxide in water while introducing an oxidizing gas, after which the precipitate was separated from the liquid, then washed and dried and reduced with hydrogen at a temperature of 250–500° C., after which it was finely stabilized. According to the invention the above-mentioned suspension contains at least one compound of at least one metal of the group formed by Ge (germanium), Sn (tin), and Al (aluminum) and that in such a concentration that the atomic ratio $r=Me/Fe$ in this solution is at least 0.005.

It has been found that the method according to the invention enables the preparation of powders which, as regards their usefulness as a material for magnetic recording, are considerably better than the known powders which have likewise been obtained by the reduction of iron oxides. This will be illustrated in the following examples. Before describing the examples it is to be noted that for the method according to the invention it is essential that the above-mentioned compound(s) of germanium and/or tin and/or aluminum are already present in the solution of the iron salt during the formation of the precipitate of iron oxide hydrate.

In order to characterize the powders prepared as described in the examples, the properties thereof, which are most important for the usefulness of the material as a material for magnetic recording, have been measured. The results of the measurements are recorded in a table at the end of each of the examples. The magnetic values stated in the table are expressed in Giorgi-units. The symbols used have the following meanings:

$\mu_0$, the magnetic permeability (ratio B/H) in vacuo,
$I_{H_c}$, the magnetisation coercive force,
$H_r$, the remanent coercive force,
$\sigma_s$, the magnetic moment per kg. in a field of $10^6$ amp./metre,
$\sigma_r$ the remanent magnetic moment per kg. after magnetisation in a field of $10^6$ amp./metre.

EXAMPLE 1

First of all iron powder was prepared in which the formation of the precipitate of α-FeO(OH) took place without the presence in the alkaline liquid of a compound of one of the metals germanium, tin or aluminium. This blank experiment was carried out as follows:

67.2 gms. of $FeSO_4 \cdot 7H_2O$ were dissolved in 336 mls. of distilled water. The resulting solution was poured, while stirring, into a cooled solution of 112 gms. of NaOH in 560 mls. of distilled water. Air at a rate of 5 ls. per min. was then passed through the thus formed suspension of ferro-hydroxide at room temperature and for 166 hours. The α-FeO(OH) precipitated from the mixed solution was washed with distilled water until the wash water had a pH of 6. The precipitate was then rinsed with acetone and dried in air.

Approximately 150 mgms. of the resulting dry iron oxide hydrate were reduced by treating it for 60 min. at a temperature of 350° C. with hydrogen which was supplied at a rate of 940 mls. per min. The resulting iron powder was stabilized. For that purpose it is first immersed in acetone. After some time (for example one hour) the acetone was removed. The powder is then dried in air for a few hours.

In the experiments to be described hereinafter, the mixed solutions in which the percipitates of the iron oxide hydrate were formed, contain germanium oxide, $GeO_2$.

(a) 33.6 gms. of $FeSO_4 \cdot 7H_2O$ were dissolved in 168 mls. of distilled water. Furthermore 56 gms. of NaOH and 0.0142 gm. of $GeO_2$ were dissolved in 280 mls. of distilled water, after which the solution is cooled to room temperature. It was then added, while stirring, to the above-mentioned solution of ferrosulphate. Air at a rate of 5 ls. per min. was then passed through the suspension of ferrohydroxide thus formed at room temperature for 24 hours. The formed precipitate was again washed until the wash water had a pH of 6. The iron oxide hydrate was then rinsed three times with acetone and dried in air. A small quantity of the resulting powder is reduced with hydrogen after which it was stabilized as stated in the description of the blank experiment.

The following experiments 1*b*, 1*c* and 1*d* differ from the experiment 1*a* in that the quantities of dissolved $GeO_2$ were different. These quantities were successively 0.1279 gms., 0.5 gm. and 1.27 gms., respectively.

The results measured in the various preparations are recorded in the following Table 1.

TABLE 1

| Powder prepared according to experiment | $r=\frac{Me}{Fe}$ | $(\mu_o \cdot {}_IH_o)\times 10^4$ (in Vsec./m.²) | $(\mu_o \cdot H_r)\times 10^4$ (in Vsec./m.²) | $\sigma_s \times 10^4$ (in Vsec. m./kg.) | $\frac{\sigma_r}{\sigma_s}$ |
|---|---|---|---|---|---|
| I (blank) | | 495 | 650 | 2.23 | 0.31 |
| 1a | 0.001 | 450 | 702 | 2.54 | 0.25 |
| 1b | 0.010 | 1,205 | 1,573 | 2.36 | 0.47 |
| 1c | 0.040 | 1,304 | 1,606 | 2.22 | 0.48 |
| 1d | 0.100 | | | | |

The powder obtained according to experiment 1*d* was found to be so pyrophoric that it could not be stabilized.

EXAMPLE 2

For the experiments to be described (2*a*, 2*b*, 2*c* and 2*d*) the following solutions were prepared:

Four equal solutions of 33.6 gms. of $FeSO_4 \cdot 7H_2O$ in 168 mls. of distilled water ("solutions A").

Four equal solutions of 56 gms. of NaOH in 280 mls. of distilled water, i.e. a 0.2 N solution, which solutions were cooled to room temperature ("solutions B").

Four different solutions of $SnCl_2 \cdot 2H_2O$ in 10 mls. of distilled water ("solutions C"). The quantities of dissolved $SnCl \cdot 2H_2O$ in the solutions C are successively 0.0279 gm., 1.0955 gms., 2.73 gms. and 0.273 gm., respectively.

While stirring, always one of the solutions B was added to one of the solutions A, after which to each of the four formed mixtures one of the solutions C was added. Air at a rate of 5 ls. per min. is passed through the thus formed suspensions of ferrohydroxide at room temperature for 24 hours. The resulting precipitates of iron oxide hydrate were washed until the pH of the wash water had reached the value 6. The precipitates were then each rinsed three times with acetone and dried in air. Approximately 150 mgms. of each of the dry powders were reduced by heating at 350° C. in a stream of hydrogen for 60 min. The hydrogen was supplied at a rate of 940 mls. per min. The metal powders formed were stabilized. The following Table 2 gives a survey of the properties of the resulting metal powders.

TABLE 2

| Powder prepared according to experiment | $r=\frac{Me}{Fe}$ | $(\mu_o \cdot {}_IH_o)\times 10^4$ (in Vsec./m.²) | $(\mu_o \cdot H_r)\times 10^4$ (in Vsec./m.²) | $\sigma_s \times 10^4$ (in Vsec. m./kg.) | $\frac{\sigma_r}{\sigma_s}$ |
|---|---|---|---|---|---|
| I (blank) | | 495 | 650 | 2.23 | 0.31 |
| 2a | 0.001 | 410 | 634 | 2.54 | 0.22 |
| 2b | 0.010 | 710 | 881 | 2.42 | 0.45 |
| 2c | 0.040 | 1,250 | 1,612 | 2.31 | 0.47 |
| 2d | 0.100 | 1,420 | 1,850 | 2.21 | 0.47 |

EXAMPLE 3

Four solutions of 33.6 gms. of $FeSO_4 \cdot 7H_2O$ in 168 mls. of distilled water were prepared. In each of these solutions was also dissolved a small quantity of $Al_2(SO_4)_3 \cdot 16H_2O$ and that in the first solution 0.0765 gm. in the second solution 3.04 gms., in the third solution 7.60 gms. and in the fourth solution 0.35 gm. (four "solutions A"). Furthermore four solutions ("solutions B") of always 56 gms. of NaOH in 280 mls. of distilled water were prepared, which solutions were cooled to room temperature. One of the solutions B was added to each of the four solutions A, while stirring. Air at a rate of 5 ls. per min. was passed through each of the four thus formed suspensions of ferrohydroxide at room temperature for 24 hours. The four precipitates were washed until the wash water had reached a pH of 6. The washed precipitates were then rinsed three times with acetone and dried in air, after which they were reduced and stabilized as described in Examples 1 and 2. The properties of the resulting metal powders (Experiments 3*a*, 3*b*, 3*c* and 3*d*) are recorded in Table 3.

TABLE 3

| Powder prepared according to experiment | $r=\frac{Me}{Fe}$ | $(\mu_o \cdot {}_IH_o)\times 10^4$ (in Vsec./m.²) | $(\mu_o \cdot H_r)\times 10^4$ (in Vsec./m.²) | $\sigma_s \times 10^4$ (in Vsec. m./kg.) | $\frac{\sigma_r}{\sigma_s}$ |
|---|---|---|---|---|---|
| I (blank) | | 495 | 650 | 2.23 | 0.31 |
| 3a | 0.002 | 565 | 842 | 2.55 | 0.28 |
| 3b | 0.009 | 1,270 | 1,597 | 2.24 | 0.47 |
| 3c | 0.080 | 1,190 | 1,574 | 1.68 | 0.47 |
| 3d | 0.200 | 1,085 | 1,539 | 1.57 | 0.43 |

From the measured results recorded in the above tables may be seen that when a quantity of germanium, tin or aluminum was in the solution in which the iron oxide hydrate was precipitated such that in said solution the atomic ratio $r=Me/Fe$ is at least 0.005, the values of the quantities $\mu_o \cdot {}_IH_c$, $\mu_o \cdot H_r$ and $\sigma_r/\sigma_s$ with respect to the values obtained in the blank experiment were considerably improved and that to such an extent that the metal powders obtained according to the invention are very readily suitable to be used as a material for magnetic recording.

What is claimed is:

1. A method of preparing a magnetically stable powder consisting mainly of iron, for magnetic recording comprising the steps of precipitating $\alpha$-FeO(OH) from a suspension of ferro-hydroxide in water having a concentration of hydroxyl ions of at least 0.2 normal and containing at least one compound of at least one metal (Me) selected from the group consisting of Ge (germanium), Sn (tin), and Al (aluminum) in such a concentration that the atomic ratio $r=Me/Fe$ in said solution is at least 0.005, while introducing an oxidizing gas, separating said $\alpha$-FeO(OH) from the liquid, washing and drying the precipitate, then reducing the precipitate with hydrogen at a temperature of 250–500° C. and then stabilizing it.

References Cited

UNITED STATES PATENTS

| | | | |
|---|---|---|---|
| 827,717 | 8/1906 | Edison | 75—0.5A |
| 2,179,810 | 11/1939 | Brill et al. | 75—0.5AA |
| 2,497,268 | 2/1950 | Neel | 75—0.5AA |
| 2,592,321 | 4/1952 | Neel | 75—0.5AA |
| 3,026,215 | 3/1962 | Fukuda et al. | 148—105 |
| 3,206,338 | 9/1965 | Miller et al. | 148—105 |
| 3,276,921 | 10/1966 | Freeman | 75—0.5AA |
| 2,660,522 | 11/1953 | Marguaire | 75—0.5AA |

FOREIGN PATENTS

| | | | |
|---|---|---|---|
| 743,791 | 3/1954 | Great Britain | 75—0.5 |
| 749,265 | 8/1954 | Great Britain | 75—0.5 |

L. DEWAYNE RUTLEDGE, Primary Examiner

W. W. STALLARD, Assistant Examiner

U.S. Cl. X.R.

148—105

PO-1050
(5/69)

UNITED STATES PATENT OFFICE
CERTIFICATE OF CORRECTION

Patent No. 3,598,568 Dated August 10, 1971

Inventor(s) Cornelis Johannes Klomp and Gerard Willem Van Oosterhou

It is certified that error appears in the above-identified patent and that said Letters Patent are hereby corrected as shown below:

Column 2, line 28, line should begin as --A blank experiment was first carried out, i.e. an iron powder--.

line 31, "aluminium" should be --aluminum--.

lines 47, 49, 65, "is" should be --was--.

Column 3, In Table 1, 2 and 3, "$(\mu_o \cdot {}_1H_o)$" should be --$(\mu_o . {}_1H_C)$--.

line 38, "is" should be --was--.

Signed and sealed this 25th day of January 1972.

(SEAL)
Attest:

EDWARD M.FLETCHER,JR.
Attesting Officer

ROBERT GOTTSCHALK
Commissioner of Patents